Figure 3:
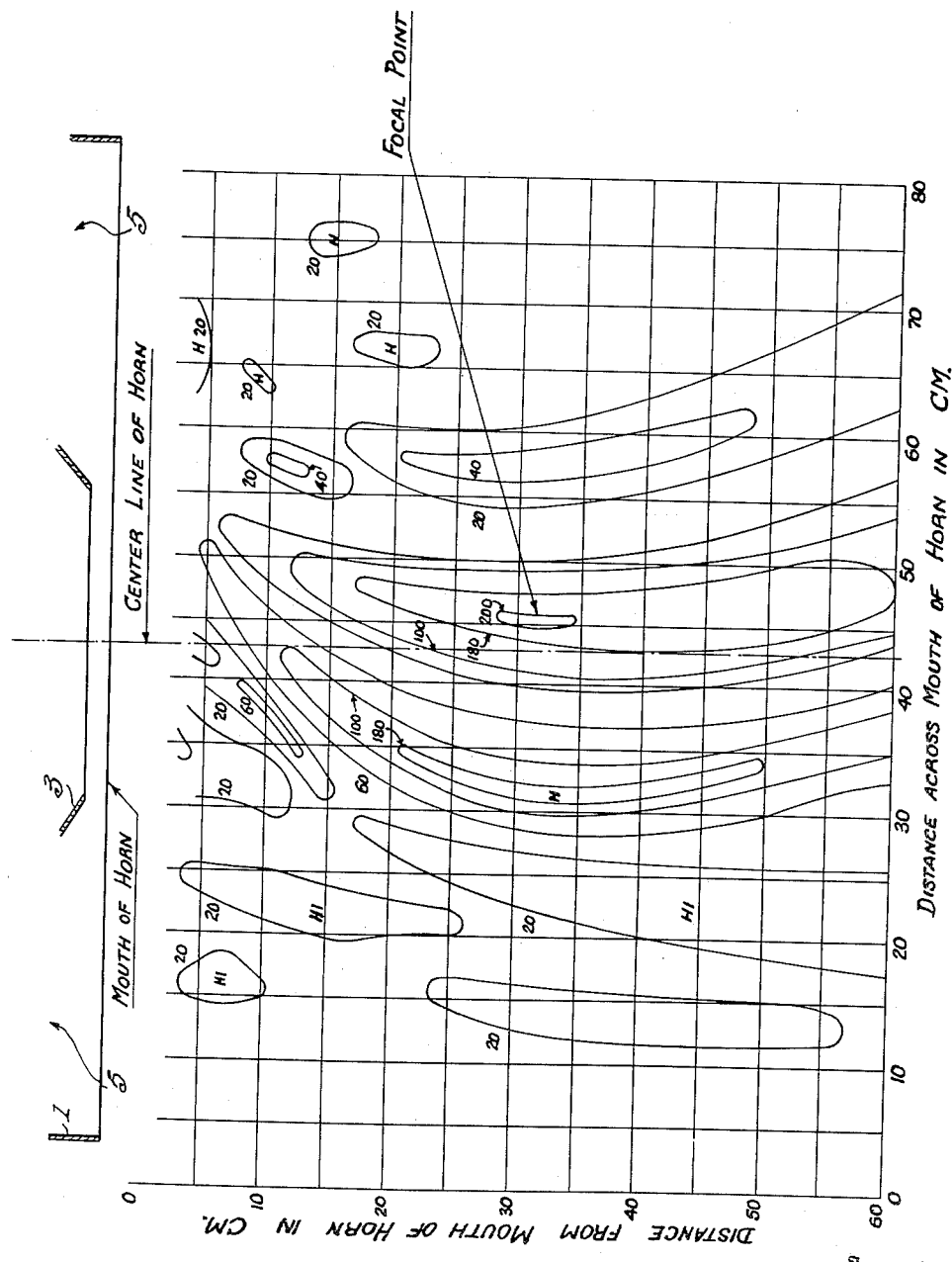

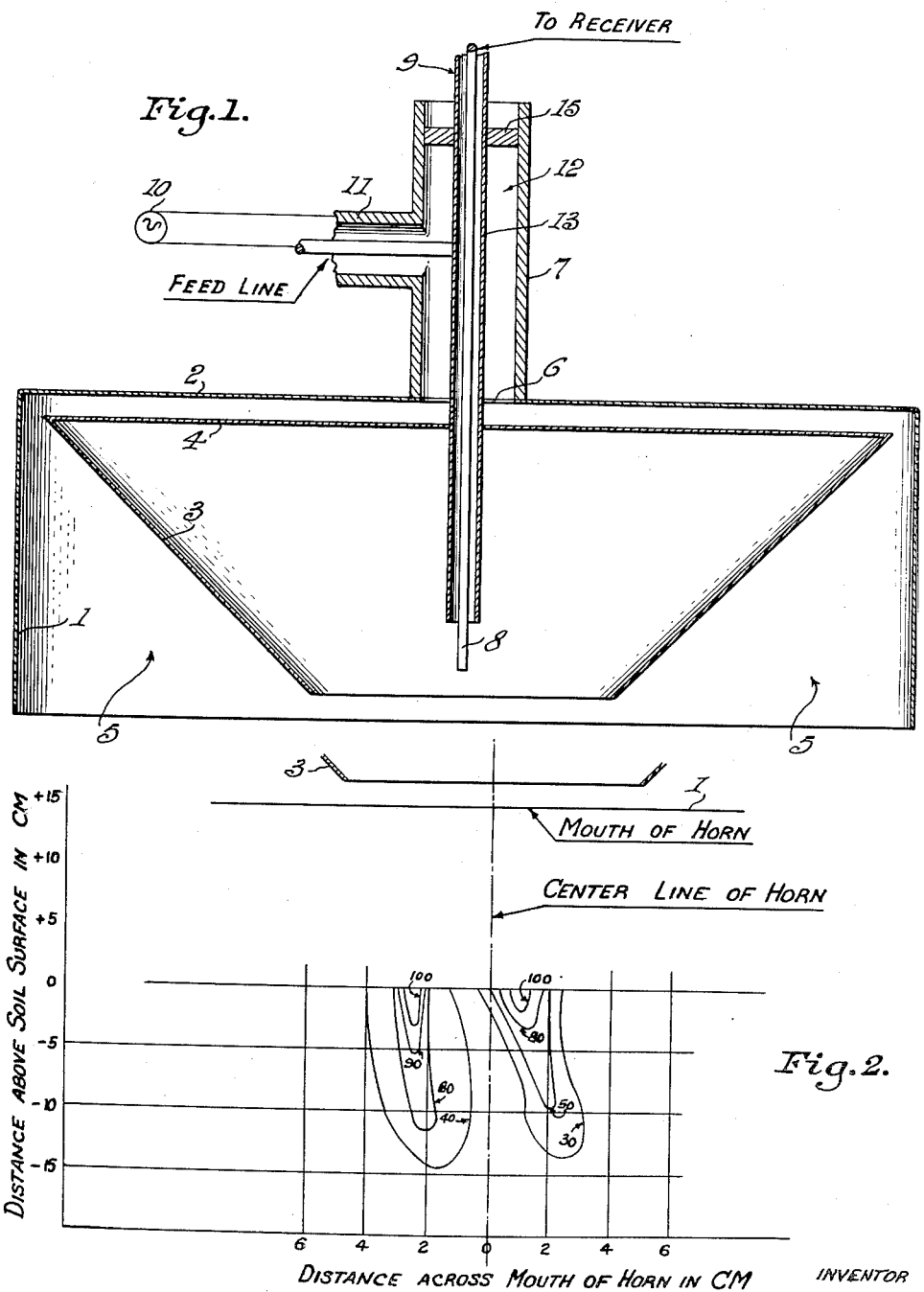

UNITED STATES PATENT OFFICE 3,019,437
Patented Jan. 30, 1962

3,019,437
MICRO-WAVE ANTENNA
George B. Hoadley, Raleigh, N.C., assignor to the United States of America as represented by the Secretary of the Army
Filed Jan. 13, 1955, Ser. No. 481,724
11 Claims. (Cl. 343—725)

This invention relates to apparatus for launching electromagnetic radiation into space and reception of such radiation and more particularly to an antenna structure having radiated beam definition for mine detection work.

Electromagnetic waves may be transmitted or received by means of devices which are resonant at the frequency of the source of electromagnetic energy or, if properly electrically matched to the source, may have fairly broad band characteristics. Such devices may be wire antenna arrangements or, when the frequency is sufficiently high, may be in the nature of spaces defined by conductive surfaces since at those frequencies the physical dimensions of the conductive surfaces are large compared with the wave length and do not entail excessive physical size. Devices of the latter type have been variously described as horns, which because of their physical configuration, are capable of concentrating a radiated or received electromagnetic wave into a confined pattern approaching directivity. Directional intercommunication at ultra-high frequencies has been obtained by combining several of such horns into a mutual antenna construction which may operate alternately on transmitting and receiving or which, with means for preventing interference between the transmitting and receiving portions, may be designed to operate concurrently. Various directional patterns have been obtained by such mutual horn arrangements, particularly in the case of biconical arrangements having a pair of horns in rotationally symmetrical arrangement with means for sending or receiving disposed intermediate the respective conical members. The purpose of these arrangements, however, is to obtain radiated directivity rather than beam definition and would not be suitable, for example, in locating surface or subterranean electromagnetic reflecting devices as in mine detection.

Mine detectors as presently known employ relatively long wave lengths. Utilization of micro-waves for mine detection, as contemplated in the instant invention, is necessary in order to obtain improved beam definition to facilitate differentiating a land mine from the surrounding ground irregularities. However, radio frequency energy having wave lengths sufficiently short to accomplish this is attenuated to such an extent that the radiated energy does not penetrate the soil sufficiently to permit reflective wave energy from a buried mine to be detected from that wave energy reflected by the ground surface, transmitted energy and anomalies both on and in the ground such as stones, holes, roots, etc. The height above ground and the variation in the angle with the ground of the detector head also affect the operation of the detector. The instant invention is directed toward overcoming these operating difficulties and using microwave radiation to obtain improved beam definition for the detection of buried metallic mines.

Accordingly, it is an object of this invention to provide a continuous transmission and reception micro-wave antenna arrangement having radiated beam definition adaptable for mine detection.

Another object of this invention is to provide a microwave antenna arrangement for concentrating electromagnetic radiation from several different angles on a limited area within a focal distance which is short relative to the size of the antenna.

A further object of this invention is to provide a microwave antenna arrangement which will direct an electromagnetic beam within a restricted area not affected by tilt of the antenna arrangement.

A still further object of this invention is to provide a directive concentrated electromagnetic radiated field having a substantially transverse electric field.

This invention embodies generally a micro-wave antenna of rotationally symmetrical structure having a pair of smooth conductive surfaces of revolution concentrically disposed along a common axis to define a continuous space between the surfaces which flares or increases in volume along a space axis inclined towards one end of the common axis of the surfaces to provide a cavity or space guide for transmitted electromagnetic radiation which will concentrate such radiation in a limited area surrounding the common axis. The flaring space guide may be several wave lengths across its outer edge and the flaring is such as to match the impedance of the space to free space. A source of micro-wave electromagnetic energy is connected through a coaxial transmission line in tandem with a radial transmission line to the space guide defined by the concentric surfaces and an electromagnetic axial receptor extends along the common axis through the transmission line and into the inner space defined by the inner surface. The inner surface thus defines the one boundary of the transmitting space guide and in addition acts as an electromagnetic shield between the electromagnetic reception area within the inner surface and the transmitting area between the two surfaces to prevent interference therebetween. The axial receptor is connected at one end to a micro-wave receiving apparatus, and terminal means are provided in the wave guide in the form of an adjustable tuning piston which may be adjusted to maintain an odd multiple quarter wave length between the piston and the place of introduction of the transmitted electromagnetic energy into the coaxial line. This terminal arrangement thus acts as an insulating support for the inwardly flaring member of the antenna space guide.

In the drawings, FIG. 1 is a cross section of the device taken on a plane parallel to the axis to reveal details of the antenna arrangement;

FIG. 2 is a contour map plotting relative signal penetration in soil of a specific operable embodiment of the invention; and FIG. 3 illustrates a contour map wherein the relative signal strength in the area adjacent to the transmitting end of the antenna arrangement is plotted with respect to the physical dimension across the transmitting end of the antenna arrangement and the displaced distance therefrom.

Referring now to FIG. 1 which illustrates the preferred embodiment of this antenna arrangement, there is shown a cylindrical surface of revolution 1 which is partially closed at one end by a circular base plate as shown at 2. Concentrically disposed along a common axis within the cylindrical surface 1 is a truncated conical surface of revolution 3 which is closed at the large diameter as indicated at 4 and disposed so that the great diameter is adjacent the partially closed end of the cylindrical surface 1. The juxtaposed surfaces define a space between them which increases in volume along a space axis inclined towards the common axis of the surfaces at the open ends as indicated at 5, which configuration accomplishes radiated electromagnetic beam definition as will be hereinafter more specifically described.

This physical arrangement is designed to concurrently transmit and receive ultra-high frequencies in accordance with the principal objects hereinbefore stated. To accomplish such concurrent operation, there is provided a central aperture 6 in the closed end 2 of the cylindrical surface 1 to which there is attached a wave guide 12 which acts as a coaxial transmission line preferably in the form of a hollow conductive pipe 7 extending away from the closed end of the surface 2 along the common axis. An axial receptor in the form of a vertical probe 8 is disposed in the wave guide along the common axis and extends into the area defined by the inner truncated conical surface. The axial receptor 8 may be connected through a suitable coaxial line 9 to suitable microwave receiving apparatus not shown. A source of electromagnetic ultra-high frequency energy 10 such as a klystron oscillator, may be suitably connected through a wave guide feed or preferably through a coaxial feed line 11 to the wave guide 12 at some point intermediate its respective ends. A cylindrical member 13 is concentrically disposed within the wave guide 12 to surround the axial receptor 8 to shield the received radiations from the transmitted radiations within the wave guide 12 and thereby prevent interference between the oppositely directed radiated waves. There is a direct coupling between the central conductor of the coaxial feed line 11 and the member 13. Thus, the member 13 serves a dual purpose as the outer conductor for received electromagnetic energy and the inner guide surface for the transmitted energy. The inverted truncated conical surface 3 and its closure at the great diameter 4, in addition to defining a boundary for the transmitting space guide, also acts as a continuation of the shield 13 to enable reception of reflected electromagnetic waves within the inner area defined by this surface without interference from the radiated beam. Non-conducting spacers may be disposed between the closed end 2 of the cylindrical surface 1 and the adjacent closed end 4 of the surface 3 to maintain uniform spacing therebetween and insure equal distribution of power fed to the periphery of the space 5.

The source of electromagnetic energy 10 is further isolated from the receiving apparatus and the transmitted electromagnetic energy is directed axially within the wave guide 12 towards the space 5 defined by the two surfaces 1 and 3 by means of a reflecting device which is preferably in the form of a longitudinally adjustable tuning piston 15 disposed at the terminal end of the wave guide 12 and which has a central aperture therein through which the axial receptor 8 and its shield 13 may extend. Thus, depending upon the frequency of the source of electromagnetic energy, the piston 15 may be adjusted longitudinally within the wave guide 12 for maximum radiation and to maintain an insulating electrical dimension of multiple odd quarter wave lengths between the point of feed in the wave guide 12 and the terminal end thereof as defined by the piston 15.

In operation, the electromagnetic source of micro-wave energy will deliver electromagnetic energy to the wave guide 12, which acts as a coaxial transmission line with the shield 13 as the central conductor, which energy is reflected down the guide as transmission line waves into the space defined by the cylindrical surfaces 1 and 3 and out the open end of the space 5 in a mode of operation having a horizontally polarized transverse electric field, i.e. parallel to the mouth of the antenna, and in a predominantly forward direction towards the common axis, where the radiated beam is concentrated within a limited area concentric about such axis at a minimum distance, relative to the physical dimensions of the surfaces 1 and 3 from the open ends of such surfaces. In one application of this antenna arrangement where an electromagnetic reflecting surface is within or adjacent the limited area of concentration of the radiated beam, the radiations are reflected in a direction predominantly towards the axial receptor 8 where the radiations excite the axial receptor 8, which in turn guides the received energy within the shield defined by the surface 13 free from interference with the transmitted waves within the space guide defined by the surfaces 1 and 3, along the receptor 8, to suitable receiving apparatus.

The physical dimensions of the various wave guide elements herein disclosed are generally comparable with the lengths of the waves transmitted and an exemplary physical embodiment of the structure of FIG. 1 was constructed and tested for use at 3000 megacycles with corresponding dimensions as will be hereinafter described.

The distance from the adjustable piston 15 in the wave guide 12 to the point of coaxial feed from the source 10 was a three-quarter wave length stub section of approximately 3 inches. The remaining distance of the wave guide 12 from the feed to the point of connection with the cylindrical surface 1 at 6 is not critical since it acts merely as a continuation of the coaxial feed from the source 10. The radial distance from the common axis of the surfaces of revolution to the cylindrical surface 1 is not critical for the same reason. The function of the portion of the space guide defined by the closed ends 2 and 4 respectively of each of the surfaces 1 and 3 is to spread the electromagnetic waves towards the periphery thereof so that all parts of the flaring continuations of the space guide 5 receive these waves at substantially the same phase. Polystyrene spacers were used in that portion of the space guide which extends radially between the closed ends of the surfaces to maintain a substantially uniform spacing of ¼ of an inch at the frequency used in order to assure equal distribution of radiated power at the periphery where the transmitted waves feed into the flaring space 5. Polystyrene spacers were also used in other parts of the structure, as in the coaxial lines between 13 and 8, 13 and 7 in accordance with standard micro-wave practice.

The dimensions of the concentric horn arrangement proper are not critical but are comparable to the wave lengths used and, in the exemplary embodiment constructed, were such that the axial distance of the cylindrical surface 1 was approximately 10 inches and the diameter was approximately 30 inches. Likewise, the great diameter of the surface 3 was approximately 29½ inches and the small diameter at the truncated open end was approximately 6 inches, leaving a quarter inch space between these surfaces at the periphery of the radial space guide portion defined between the closed ends of these surfaces. The axial length of the surface 3 was approximately 8¾ inches so that when surfaces 1 and 3 were mounted on their common axis there was approximately a one-inch space between the respective open ends of each surface. The axial receptor 8 extended into the inner space defined by the surface 3, a distance of approximately 6 inches, leaving approximately a 2-inch space between the free end of the receptor 8 and the mouth of the surface 3.

Other dimensions employed in the test structure are likewise not critical and may be varied within the general structural relationships previously set forth. In this respect, it was found that a conical angle between the base 4 and the conical surface 3 of approximately 40 degrees was satisfactory. The surfaces 1 and 3 were constructed from galvanized sheet steel or iron having a thickness sufficient to provide mechanical rigidity and in the test structure approximately ¹⁄₁₆ of an inch. In like manner, the cylindrical member 13 was constructed from brass tubing having approximately ½ inch outer diameter and ⅜ inch inner diameter and the wave guide 12 was constructed from brass tubing having approximately a ⅞ inch inner diameter. The coaxial line may be any standard line which will serve the intended purpose of feeding the energy from the source 10 to the wave guide 12.

In operation, the electromagnetic energy is fed from the source 10 along the coaxial transmission line 11 to the wave guide 12 and proceeds down this guide and out through the radial portion of the space guide defined by the surfaces 1 and 3 to the flaring space 5. The radiated waves emerge from the mouth of the horn arrangement as a horizontally polarized transverse electric field and are directed towards a focal area a distance beyond the mouth which is relatively short in comparison to the physical size of the antenna horn arrangement. Investigation of the inner area of the surface 3 disclosed a constant low signal intensity which could be balanced out in operation by tuning. When the mouth of the resonating horn arrangement is placed in proximity with a metal object, the reflected signal is picked up by the axial receptor 8 and is fed to the receiving apparatus 9 through the coaxial line formed by the member 13 and the receptor 8. This reflected signal is shielded from the transmitted wave by the surface 3 and the member 13 to render the receiver responsive to only reflected signal energy.

The results of tests conducted on the hereinbefore described exemplary embodiment are shown in FIGS. 2 and 3 of the drawings which illustrate a radiation pattern in a vertical plane in the ground immediately below the mouth of antenna horn arrangement and in a horizontal focal plane a suitable distance from the mouth of the horn arrangement respectively. These patterns illustrate contour lines of relatively equal signal strength plotted as an indication of field intensity, in millivolts per centimeter, for a definite distance from the antenna to show the focusing action of antenna. The contour patterns of FIG. 2 also illustrate the attenuation of the radiated energy in the soil. Thus, the hereinbefore described short wave antenna arrangement enables concurrent transmission and reception of electromagnetic energy in a directive pattern which concentrates the transmitted energy from a plurality of angles at a predetermined area of focus within a limited distance from the antenna. The arrangement is such that a substantially transverse electric field which is horizontally polarized can be directed at a concentrated area and reflected from a reflective surface within that concentrated area to indicate the presence and location of the reflective surface which may be a metallic explosive mine or similar object.

Having thus described my invention, what I claim as new and wish to secure by Letters Patent is:

1. An antenna comprising in combination, an outer cylindrical and inner truncated conical member defining surfaces of revolution concentrically disposed with their axes of revolution in alignment on a common axis to define a continuous space therebetween, said inner truncated conical surface tapering inwardly towards one end of said common axis, another cylindrical member defining surface of revolution extending outwardly from said outer cylindrical surface of revolution towards the other end of said common axis for guiding electromagnetic energy from the continuous space between the surfaces of revolution towards a focal point on said common axis, said other cylindrical surface of revolution enclosing means for guiding received electromagnetic energy from within the inner surface of revolution towards the other end of said common axis, and means for isolating said transmitted radiated energy from said received radiated energy.

2. An antenna comprising in combination, a pair of member defining surfaces of revolution, one of said surfaces of revolution being conical and truncated at the small diameter and having a closure at the large diameter, said other surface of revolution being cylindrical and arranged concentrically with said truncated surface of revolution and having a closure in face relation with the closure on said truncated surface, each of said surfaces being spaced from the other to define an electromagnetic radiating space therebetween, a conducting wave guide extending away from said other cylindrical surface of revolution along the common axis and communicating with the space between said surfaces, said wave guide including means for concurrently connecting the space between the surfaces with a source of electromagnetic radiation, said wave guide including other means for connecting the space within said truncated conical surface with a receiver, and means in said conducting wave guide for preventing interference between said source of energy and said receiver.

3. An antenna comprising in combination, a cylindrical member defining a surface of revolution having a closure at one end with a central aperture therethrough, a truncated conical member defining a surface of revolution closed at the great diameter, said cylindrical surface enclosing said truncated conical surface in concentric juxtaposed relation with respect to a common axis to define an electromagnetic radiating space guide therebetween, the closed ends being adjacent each other, a conducting wave guide extending from the aperture in the enclosure of said cylindrical surface along the common axis including means for concurrently connecting the space between said surfaces with a source of electromagnetic energy and the space within said truncated conical surface with a receiver, and terminal means in said conducting wave guide for isolating said source of energy from said receiver.

4. An antenna comprising in combination, a cylindrical member defining a surface of revolution, partially closed at one end, a truncated conical member defining a surface of revolution closed at the great diameter, said cylindrical surface enclosing said truncated conical surface in concentric relation with respect to a common axis to define a space therebetween, the closed ends being adjacent each other, a conducting wave guide extending along the common axis from the partially closed end of said cylindrical surface and communicating with the space between said surfaces, conducting means extending along the common axis through said wave guide and into said truncated conical surface, coaxial means connecting said wave guide and the space between said surfaces to a source of electromagnetic energy, terminal means for concurrently connecting said conducting means to a receiver.

5. An antenna comprising in combination, a cylindrical member defining a surface of revolution partially closed at one end, a truncated conical member defining a surface of revolution closed at the great diameter, said cylindrical surface enclosing said truncated conical surface in concentric relation with respect to a common axis to define a space therebetween, the closed ends being adjacent each other, a conducting wave guide extending along the common axis from the closed end of said cylindrical surface and communicating with the space between said surfaces, an axial receptor supported along the common axis within said truncated conical surface, coaxial means for concurrently connecting the space between said surfaces to a source of electromagnetic energy through said wave guide and said axial receptor to a receiver respectively, and means including a tuning piston at the terminal end of said wave guide for reflecting the electromagnetic energy along the wave guide towards said cylindrical surface and isolating said source of energy from the receiver.

6. An antenna comprising in combination, an outer cylindrical and inner truncated conical member defining surfaces of revolution concentrically disposed with their axes of recolution aligned on a common axis and defining a continuous space therebetween increasing in volume towards one end of the common axis, wave guide means coupled to said outer cylindrical surface and communicating with the space defined between said surfaces, a receptor having the axis thereof coincident with the common axis and extending within the space defined by said inner truncated conical surface, means concentrically disposed about said receptor substantially throughout its length for shielding said receptor from each of said surfaces and from the space defined between said surfaces, a first coaxial means for connecting said receptor to a receiver, a second coaxial means for connecting said wave guide to a source of radiation, and wave guide terminal means for reflecting the radiation along said wave guide towards the space defined by said surfaces.

7. An antenna comprising in combination, an outer cylindrical and inner truncated conical member defining surfaces of revolution concentrically disposed with their axes of revolution aligned on a common axis and defining a continuous space therebetween increasing in volume towards one end of the common axis, wave guide means coupled to said outer cylindrical surface and communicating with the space defined between said surfaces, a receptor having the axis thereof coincident with the common axis and extending within the space defined by said inner truncated conical surface, means concentrically disposed about said receptor substantially throughout its length for shielding said receptor from each of said surfaces and from the space defined between said surfaces, a first coaxial means for connecting said receptor to a receiver, a second coaxial means for connecting said wave guide to a source of radiation and a piston adjustably mounted as a closure for the terminal end of said wave guide for reflecting the radiation along the wave guide towards the space defined between said surfaces.

8. An antenna comprising in combination, a cylindrical member defining a surface of revolution having a closure at one end with a central aperture therethrough, a truncated conical member defining a surface of revolution closed at the great diameter, said cylindrical surface enclosing said truncated conical surface in concentric relation with respect to a common axis to define a space therebetween increasing in volume towards the common axis, the closed ends of each of said surfaces being adjacent each other, a conducting wave guide coupled to the aperture in the closure of said cylindrical surface and extending from said surface along the common axis, an axial receptor mounted along the common axis and extending through said wave guide into the space within said inner truncated conical surface, means for connecting said axial receptor to a receiver, means coupled to said wave guide intermediate its ends for connecting said guide to a source of radiation, and a piston adjustably closing the terminal end of said wave guide for reflecting the radiation along the said wave guide towards the space between said surfaces.

9. An antenna comprising in combination, a cylindrical member defining a surface of revolution having a closure at one end with a central aperture therethrough, a truncated conical member defining a surface of revolution closed at the great diameter, said cylindrical surface enclosing said truncated conical surface in concentric relation with respect to a common axis to define a space therebetween increasing in volume towards the common axis, the closed ends of each of said surfaces of revolution being adjacent each other, a hollow type wave guide coupled to the space between the surfaces at the central aperture in the closure of said cylindrical surface, a receiving probe mounted along the common axis and extending through the wave guide into the truncated conical surface, a concentric shield disposed about said probe throughout substantially its entire length, a first conducting means for coupling said probe and outer shield to a receiver, a second conducting means for coupling said wave guide to a source of radiation, said means comprising an outer and inner conductor, means connecting the outer conductor to the hollow pipe wave guide and the inner conductor to said concentric shield, and a piston adjustably carried in the terminal end of said wave guide.

10. An antenna comprising in combination, a pair of members defining surfaces of revolution concentrically disposed with their axes of revolution aligned on a common axis and defining a continuous space therebetween, the outermost one of said pair of surfaces being cylindrical and of constant dimension in a direction normal to the axis of revolution and having a closure in a plane normal to the axis of revolution, the closed end of said outermost surface constituting the input end thereof, the innermost one of said pair of surfaces being a truncated cone and having a closure in face relation with the closure on the outermost surface, the innermost surface tapering inwardly toward an open end thereof remote from the closed end of said outermost surface, the continuous space between said innermost and said outermost surfaces increasing in volume from the closed end of said innermost surface toward the open end thereof, conducting means attached to the closure of said outermost surface for connecting a source of electromagnetic energy to the continuous space between said innermost and outermost surfaces, electromagnetic energy receiving means coupled to the space within said innermost surface and means for preventing interference between electromagnetic energy radiated from said continuous space between said innermost and said outermost surfaces and electromagnetic energy received by said innermost surface.

11. An antenna comprising in combination, a pair of members defining surfaces of revolution concentrically disposed with their axes of revolution aligned on a common axis and defining a continuous space therebetween, the outermost one of said pair of surfaces being cylindrical and of constant dimension in a direction normal to the axis of revolution and having a closure in a plane normal to the axis of revolution, the closed end of said outermost surface constituting the input end thereof, the innermost one of said pair of surfaces being a truncated cone and having a closure in face relation with the closure on the outermost surface, the innermost surface tapering inwardly toward an open end thereof remote from the closed end of said outermost surface, the continuous space between said innermost and said outermost surfaces increasing in volume from the closed end of said innermost surface toward the open end thereof, a conducting wave guide extending from the closure of said outermost surface along the common axis and communicating with the continuous space between said innermost and said outermost surfaces, said wave guide including means for concurrently connecting a source of electromagnetic energy to the continuous space between said innermost and outermost surfaces, said wave guide including means centrally positioned for connecting the space within said innermost surface with a receiver and means in said wave guide for preventing interference between electromagnetic energy radiated from said continuous space between said innermost and said outermost surfaces and electromagnetic energy received by said innermost surface.

References Cited in the file of this patent
UNITED STATES PATENTS

| | | |
|---|---|---|
| 2,283,935 | King | May 26, 1942 |
| 2,425,488 | Peterson et al. | Aug. 12, 1947 |
| 2,650,984 | Mandel | Sept. 1, 1953 |
| 2,845,622 | Gamble | July 29, 1958 |

OTHER REFERENCES

The International Dictionary of Physics and Electronics, D. Van Nostrand Co., Inc., Princeton, N.J., page 878 relied on.